> 3,325,438
> SILK SCREEN COMPOSITION AND PROCESS
> Luciano S. Cahero, Chicago, Ill., assignor to
> Process Research, Inc., Chicago, Ill.
> No Drawing. Filed Mar. 11, 1966, Ser. No. 533,414
> 6 Claims. (Cl. 260—31.8)

The present invention relates to a novel resin composition which is useful in the process of silk screening and more especially relates to such composition which substantially completely eliminates much of the undesirable adherence and smearing encountered in the prior art.

Silk screening processes of design transfer represent by now an old well-developed art and it is not deemed necessary in the present specification to greatly elaborate upon such processes. Essentially a stencil or mask of the desired design to be transferred is formed on a screen and then one applies a marking media through the screen onto the substrate upon which the design transfer is required. The screen, which may be fabricated of silk or metal wires or plastic threads is therefore sealed against marking media transfer at selected portions thereof. The substrate varieties are almost infinite and may be exemplified by cloth, paper etc.

In the actual performance of silk screening the substrate is placed in a frame or bed, the prepared screen is then superimposed upon the substrate and then the operator applies the marking media, e.g., ink, paint, etc. through the screen stencil. Fairly soon thereafter the screen is raised, the substrate to which the design is now affixed removed, a new substrate inserted and the procedure recommenced.

In the practice of the process one normally wishes to proceed as rapidly as possible, obviously and if one takes a specific example of using a fabric screen, paint and cloth it will be understood that invariably the screen is separated before the paint has completely dried on the cloth. Under these circumstances one finds there is a tendency for the cloth to adhere to the screen for some variable distance and in some cases without a clean separation there results a smearing or smudging of the image on the cloth. This may be so serious as to cause the finished product to be rejected.

Another serious problem of silk screening involves color registration when multicolors are being printed. For this purpose a plurality of screens and screening are consecutively used. First one applies one color and the screen removed. Then the next color is applied through a second screen. If the substrate moves ever so slightly when the first or subsequent screens are removed an obvious registration problem results and again the material being imprinted may have to be rejected.

To overcome these problems I have invented a composition which greatly increases the adherency of the cloth and the like to its bed and thus when the screen is removed smearing or movement to produce misregistration are practically eliminated. Yet the novel composition in no way damages or mars the cloth substrate or the like and after the screen has been removed such substrate may then be readily detached from the screen bed. The composition is spread on such bed or frame, the substrate to be marked is then laid thereupon after which the usual silk screening process is practiced.

In the past silk screen operators have used a number of means in the attempt to alleviate the substrate movement to which the present invention is directed. Vacuum frames have been tried but this is somewhat cumbersome and expensive and at the same time inoperative with porous materials. Also, various waxes and resins have been used for coating the screen bed, but these, I have found, do not work nearly as well as the present composition and in some cases they badly affect the material being imprinted as by imparting odor or color to such material.

All of theses shortcomings of the prior art are overcome by the present invention.

Accordingly a primary object of my invention is to provide a novel coating composition for use in silk screen process which composition provides for easy and ready separation of the screen from the substrate after application of the marking medium.

Another object of my invention is to provide a method of silk screening which includes the step of employing said coating composition on the silk screen bed.

These and other objects, features and advantages of my invention will become apparent to those skilled in this particular art from the following detailed disclosure thereof.

In order to make the present desirable coating composition reference should first be had to the following example which is representative of the preferred embodiment hereof:

I first form a first liquid mixture of 2170 grams of polyvinyl acetate in 85 grams of toluene. These two liquids are slowly mixed for preferably between 20 and 30 minutes to assure the formation of an intimate mixture. A second liquid mixture is then made by mixing 42 grams of glycerine with 26 grams of dibutylphthalate for between sixty and ninety seconds, again assuring intimate mixing. The two mixtures are then combined with mild stirring for approximately 5 minutes to yield the present coating composition. The composition is now ready for use or it may be stored for subsequent use.

It will certainly be understood by those skilled in this art that the composition given in the example may be reasonably varied to still provide a useful mix.

The polyvinyl acetate that is used herein is a carboxylated copolymer liquid resin. In lieu thereof, although it is somewhat less preferred one can also use liquid polyvinyl acrylic resin in the same amount.

The toluene may be replaced entirely or in part by xylol but in the preferred embodiment hereof toluene is used.

Furthermore, a modest amount of acetone may optionally be added to the final composition if one wishes to increase the flowability of the mix. In the preferred embodiment hereof it is used.

The following table presents the preferred composition and the compositional range for use herein. All of the compositions are given in terms of weight percent.

TABLE I

| | Preferred percent | Range, percent |
|---|---|---|
| Polyvinyl Acetate (or Polyvinyl Acrylic Resin) | 92 | 90–95 |
| Toluene (or Xylol) | 3.6 | 3–5 |
| Glycerine | 1.9 | 1–3 |
| Acetone | 1.5 | 0–3 |
| Dibutylphthalate | 1.0 | 1–3 |

The coating composition is then applied to the upper face of the screen bed member by a simple wiping action or the like. A thin, somewhat tacky, barely visible film results. Following this the apparatus is now ready for use.

Onto the tacky film is next applied the substrate fabric or the like and the silk screen process is then carried out. After the paint or the like is passed through the open meshes of the screen, and even while the paint is quite wet the screen may be readily and cleanly separated from the fabric. The latter sticks to the tacky film with greater adherence than to the paint containing screen. Subsequently the fabric is peeled from the tacky coat without any effect on the fabric and the process may then be repeated. The operator can easily determine when a new application of the tacky film is required.

It will be understood that various modifications and variations may be effected without departing from the spirit or scope of the novel concepts of my invention.

I claim as my invention:

1. A tacky, film forming composition consisting essentially of from 90 to 95 percent of a material selected from the group consisting of polyvinyl acetate and polyvinyl acrylic resin; from 3% to 5% of a material selected from the group consisting of toluene and xylol; from 1% to 3% glycerine; from 1% to 3% dibutylphthalate and from 0 to 3% acetone, all of said percentages being by weight.

2. The composition as defined in claim 1 wherein there is about 92% polyvinyl acetate, about 3.6% toluene, about 2.9% glycerine, about 1.0% dibutylphthalate and about 0.5% acetone.

3. In a screening process the improvement comprising using the composition defined in claim 1 at the interface between the screen bed and the substrate to be imprinted.

4. In a screening process the improvement comprising using the composition defined in claim 2 at the interface between the screen bed and the substrate to be imprinted.

5. The screening process of claim 3, wherein said process comprises:

coating said composition defined in claim 1 on said screen bed to provide said interface;

superposing said substrate on the coated screen bed, the bond of the composition being greater with the screen bed than with the substrate;

superposing the screen on said substrate;

applying liquid marking media over the screen to flow into said substrate;

removing said screen from said substrate prior to the drying of the same; and removing the imprinted substrate from the coated screen bed, thereby leaving the coated screen bed available for another unprinted substrate.

6. The screening process of claim 5 wherein the screen bed is coated with the composition defined in claim 2, and said substrate is a fabric material.

References Cited

UNITED STATES PATENTS 2,096,710  10/1937  Emmey —————————— 154—2

OTHER REFERENCES

Delmonte, J.: Technology of Adhesives, 1947, Reinhold Publishing Co. (pages 113, 114, 119 relied on).

Hess, K. H.: Textile Fibers, 1958, J. B. Lypincott Co. (pages 137–138 relied on).

Skeist, I.: Handbook of Adhesives, 1962, Reinhold Publishing Co. (pages 352, 377, 380 relied on).

MORRIS LIEBMAN, *Primary Examiner.*

A. HOLTZ, J. FROME, *Assistant Examiners.*